United States Patent

Kujoory et al.

[11] Patent Number: 6,021,263
[45] Date of Patent: *Feb. 1, 2000

[54] MANAGEMENT OF ATM VIRTUAL CIRCUITS WITH RESOURCES RESERVATION PROTOCOL

[75] Inventors: Ali Mohammad Kujoory, Lincroft; Samir S. Saad, Long Branch; David Hilton Shur, Middletown; Kamlesh T. Tewani, Freehold; James Kwong Yee, Marlboro, all of N.J.

[73] Assignee: Lucent Technologies, Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/602,428

[22] Filed: Feb. 16, 1996

[51] Int. Cl.[7] .............................. G06F 13/33; G06F 15/17
[52] U.S. Cl. .............................. 395/200.62; 395/200.73; 395/200.58; 370/409
[58] Field of Search .................... 395/200.63, 200.58, 395/200.73, 200.62; 370/395, 420, 463, 397, 399, 409

[56] References Cited

U.S. PATENT DOCUMENTS

| | | | |
|---|---|---|---|
| 5,175,800 | 12/1992 | Galis et al. | 706/45 |
| 5,440,551 | 8/1995 | Suzuki | 370/395 |
| 5,461,611 | 10/1995 | Drake, Jr. et al. | 370/420 |
| 5,491,742 | 2/1996 | Harper et al. | 379/201 |
| 5,610,910 | 3/1997 | Focsaneanu et al. | 370/351 |
| 5,623,488 | 4/1997 | Svennevik et al. | 370/360 |
| 5,640,399 | 6/1997 | Rostoker et al. | 370/466 |
| 5,740,075 | 4/1998 | Bigham et al. | 395/200.59 |
| 5,802,502 | 9/1998 | Gell et al. | 705/37 |
| 5,828,844 | 10/1998 | Civanlar et al. | 395/200.58 |
| 5,831,972 | 11/1998 | Chen | 370/230 |

OTHER PUBLICATIONS

Zhang et al., "RSVP: A New Resource ReSerVation Protocol", IEEE Network, Sep. 1993.

*Primary Examiner*—Frank J. Asta
*Assistant Examiner*—Daniel Patru

[57] ABSTRACT

A method and apparatus for use in a network utilizing Internet Protocol (IP), Resource Reservation Protocol (RSVP), and Asynchronous Transfer Mode (ATM) protocol is provided. An intelligent policy mapping database (PMD) accessible at the network level by both the RSVP and ATM protocol stacks maps RSVP parameters to ATM parameters with input from factors outside of the RSVP or ATM protocol stacks, e.g., general customer data. With the basis of customer data or other information outside of the RSVP and ATM protocol stacks, a network reservation message to the PMD contains RSVP flow specifications which are mapped to correlated ATM Quality of Service (QoS) parameters.

20 Claims, 4 Drawing Sheets

FIG. 4E

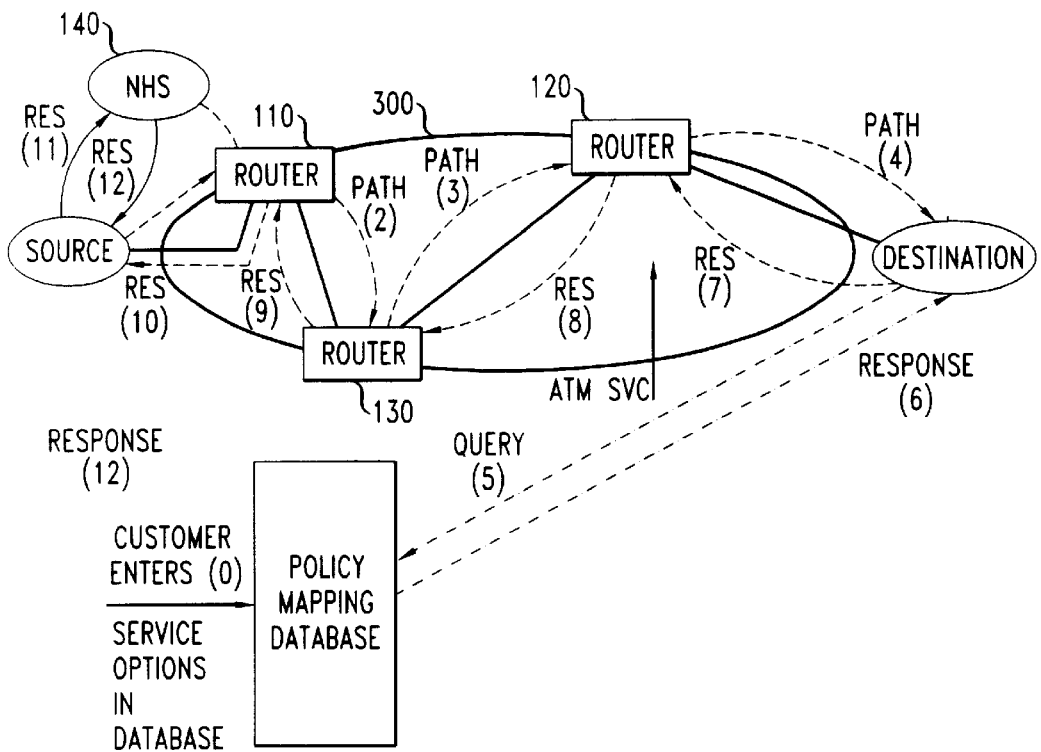

FIG. 5

- ENABLE CUT-THROUGH WITH QoS MAPPING (YES/NO)
- ENABLE CUT-THROUGH WITHOUT QoS MAPPING (YES/NO)
- HOP-BY-HOP QoS MAPPING (NO CUT-THROUGH) (YES/NO)
- NHRP LOOKUP (YES/NO)
    - IF YES
    - 3RD PARTY SETUP (YES/NO)
- RESTRICT CUT-THROUGH (YES/NO)
    - IF YES
    - CUT-THROUGH ONLY FOR DESTINATION IN
        - DOMAIN 1, DOMAIN 2, ...DOMAIN M
        - IPNET 1, IPNET 2, ...IPNET N
- DATE/TOD (TIME OF DAY OVERRIDE)
    - NO CUT-THROUGH
        - FROM T1-T2
        - FROM TN-TN-1
- MULTICAST CUT-THROUGH ALLOWED? (YES/NO)
- BACKUP OPTION (YES/NO)
- USE ALTERNATE ATM PATH WHEN PRIMARY ATM PATH FAILS? (YES/NO)

MANAGEMENT OF ATM VIRTUAL CIRCUITS WITH RESOURCES RESERVATION PROTOCOL

TECHNICAL FIELD

This invention relates to data communications and computer networking.

BACKGROUND OF THE INVENTION

The field of data communications is primarily concerned with how devices talk to each other. As in the case of human beings, for devices to speak to each other they need to use and understand the same language. These languages are called communications protocols. The protocols are agreed upon standards that are normally based on layered models which enable different vendor equipment to communicate (inter-network). A complete exposition of layered model protocols is given in Andrew S. Tannenbaum, Computer Networks, 2nd Edition, Prentice Hall, 1989.

One of the new emerging protocols is the Asynchronous Transfer Mode (ATM) protocol. ATM can be incorporated into one of the most prevalent computer protocols, the Transmission Control Protocol/Internet Protocol (TCP/IP). FIG. 1 displays a conceptual diagram of an IP over ATM Host Protocol Stack. A physical layer 10 of an ATM network consists of a regenerator level 15 which regenerates weakened signals, a digital section level 20 which disassembles and assembles a continuous byte stream, and a transmission path level 25 that assembles and disassembles the payload of the system. Sitting above the physical layer 10 is the ATM layer 30. The ATM layer is composed of a virtual path level 35 and a virtual channel level 40. The virtual path level 35 is composed of a bundle of virtual channels that have the same endpoint. The virtual channel level 40 is concerned with issues like the Quality of Service (QoS), the Switched and semi-permanent virtual-channel connections, cell sequence integrity, and traffic parameter negotiation and usage monitoring. The QoS parameter allows ATM to provide network resources based on the different types of applications being used. For example, an application may send out short bursts of information—therefore the application does not require a long connection (e.g., logging on to a remote computer). On the other hand some applications require a large amount of information and not necessarily reliable data transfer (e.g. video conferencing). Utilizing the QoS parameter, in an ATM network a file transfer can be handled differently from a video conference. The AAL5 layer 50 is the segmentation and reassembly sublayer and is responsible for packaging information into cells for transmission and unpacking the information at the other end. The LLC/SNAP layer 60 provides a mechanism for encapsulating other protocols (e.g., IP, Novell IPX) over ATM AAL5. The IP layer (70) is the network layer of the IP protocol suite, and provides a common packet format and addressing scheme capable of transporting data over multiple subnetwork technologies (e.g., Ethernet, ATM). The TCP layer (80) and UDP (User Datagram Protocol) layer (80) provide different types of transport services over IP. Applications (90) residing within an end-system may access TCP and UDP services via an applications API (Application Programming Interface).

Communication between devices in a network is performed digitally. The information to be communicated is usually represented as 0's or 1's. The information or data to be communicated (0's and 1's) is usually grouped and separated into units called packets. The layered modeled protocols discussed above are implemented in these packets by defining meaning to bits in the packets, defining different types of packets and defining the sequencing of the different types of packets.

Once data or information has been segmented into packets, the packets are sent into the network where they may take the same path or separate paths. The packets are ultimately recombined at the end device. In ATM, a communications path between two devices is established through a virtual circuit. The circuit is called a virtual circuit because the path may be established and then removed, and resources along the path may be shared by multiple virtual circuits. When the packets are sent through network switches that established virtual circuits through an automated call-setup procedure, the paths are called switched virtual circuits (SVC's).

In an IP packet network, a packet is sent from a transmitting device onto the local network and then transmitted to a device called a router. The router forwards the packet into the network. Current models for IP over ATM have described a method of communicating directly between two end devices (possibly on different subnetworks) once a path between the two devices has been established. An emerging protocol called the Next Hop Resolution Protocol (NHRP) and NHRP servers (NHS's) may be employed to map IP addresses from endpoints on different IP networks to their corresponding ATM addresses. Once the destination ATM address is acquired, a direct ATM path between source and destination may be set up. When the source and destination are members of different subnetworks, such as an ATM SVC is referred to as a cut-through or short cut SVC. Using this approach, all of the packets take the same path (virtual circuit), between the two end devices. However, in an alternative model, the communications connection between two end devices, may be established so that all packets are processed through a router. When packets are processed through a router the packets may not all take the same path. Processing packets through a router is advantageous when the applications being performed are small applications (small in time, small in bandwidth). However, processing becomes difficult when the applications have larger requirements (larger time requirements, larger bandwidth requirements). Therefore when the applications have larger requirements, it is generally advantageous to use a switched virtual circuit between two communicating end devices.

When ATM is used in the TCP/IP environment one of the key issues is SVC connection management. At one end of the spectrum a SVC could be established between all communicating entities. At the other end of the spectrum all communicating entities could be forced to go through a router. Given the diversity of applications each of these solutions would be lacking. Therefore, it would be advantageous to allow SVC management to be controlled by the requirements of the application, specifically the QoS requirement of the application.

In current TCP/IP applications the decision of whether to use an SVC or a router is based on the transmitting and destination IP address. Transport protocols such as TCP and UDP use port numbers to identify an application associated with an IP address. Some port numbers (1–255) are well known and represent services such as host functions, file transfer, and network news. Other port numbers (1024–65535) are not well known and therefore may be used to identify QoS requirements in a communications session.

An alternative mechanism for communicating the QoS requirements of an application is through a currently evolving Resource reSerVation Protocol (RSVP). RSVP enables the reservation of resources and QoS negotiations in an IP network. RSVP operates within the context of the IP protocol and therefore does not take into account the particular subnetwork technology (e.g., ATM) that IP may be operating over. Hence the resource reservation and QoS negotiations occur between communicating end-systems and network routers. In the RSVP protocol methodology a source would send a path message to a destination address to identify a communications route. The destination would request the reservation of resources for a "flow" along the route. Lastly, if the destinations reservation request is accepted, the flow receives the requested network resources and QoS from the path.

The RSVP methodology is supported by several component parts of the RSVP protocol. The first component part is a flow specification which describes the characteristics of the packet stream sent by the source (e.g., short packets of intermittent frequency for terminal communications, longer packets that are generated at more regular intervals for video teleconferencing). The flow specification specifies the desired QoS and is used to set the packet scheduler parameters. Next, a routing protocol provides communication paths. A setup protocol enables the creation and maintenance of the resources reserved. An admission control algorithm maintains the network load at a proper level by rejecting resource requests that would cause the level to be exceeded. Lastly, a packet scheduler is placed in the routers in the path between the source and destination to assure the right QoS.

FIG. 2 displays a flow model of the RSVP model as it is currently implemented over an IP network. In the current implementation of RSVP, packets are classified based on their "session" and "filterspec" parameters (based on among other things, source and destination addresses), and service by the IP protocol is based on the flow specification (referred to as a "flow" for short). The flow model of FIG. 2 shows packet processing within a router. A classifier 110 separates communicating packets based on their "session" and "filterspec" parameters as shown by 120. The packets are then channeled into a packet scheduler 130 for processing by an output driver 140, which outputs the data at 150, the interface leading to the "next-hop" router in the path to the destination (or the destination itself in the case when the next-hop is the destination).

SUMMARY OF THE INVENTION

The present invention defines a method and architecture for implementing RSVP over IP/ATM. In the proposed architecture the resources necessary for a communications pathway between two devices are defined by applications resource requirements. The applications requirements are mapped into RSVP parameters via an RSVP and IP capable Application Programming Interface (API), resident in the host computer. When ATM is used in a network, a straight-forward approach is to translate RSVP flow specification parameters to corresponding ATM QoS parameters (Note that the mapping of RSVP parameters to ATM parameters do not correspond exactly). Thus if X represents the set of RSVP parameters, and Y is the set of ATM QoS parameters, then Y=F(X), where F is a function that maps X onto Y.

The present invention augments the mapping of RSVP to ATM by utilizing a database (D) as an interface between the RSVP parameters and the ATM parameters. The database (D) contains user end point (also referred to as a customer) data, used to characterize the network requirements of the customers. Therefore the mapping of RSVP parameters to ATM QoS parameters now takes the form Y=F(X, D), where X, Y and F have the same meaning as above, and D is a policy mapping database (PMD). This database is consulted whenever a mapping from X to Y is to be performed. The use of the database permits decisions and choices to be made that are not possible when a straight-forward mapping from X to Y is employed. For example, the policy mapping database (PMD) gives a user the ability to enable a "short-cut" SVC with QoS mapping or without QoS mapping, disable a "short-cut" SVC establishment and support hop-by-hop QoS mapping. The database enables the user to define whether the Next Hop Resolution Protocol(NHRP) is invoked or not; whether a SVC backup should be established, a Time-of-day override should be implemented, or an alternate ATM path should be used when the primary ATM path fails.

In addition, the mapping from X to Y can depend on customers subscription to different levels of security, priority and performance, time of day information, and information about the network state. In summary RSVP flow specifications are mapped to ATM switched virtual circuits with specified QoS utilizing a policy mapping database (PMD). As a result of mapping the flow specifications of RSVP to the QoS requirements of ATM, the proposed method and architecture enables the implementation of RSVP over IP over ATM.

BRIEF DESCRIPTION OF THE DRAWINGS

The objects, advantages and novel features of the invention will be more fully apparent from the following detailed description when read in connection with the accompanying drawings wherein:

FIG. 4E details a scenario where the destination queries the PMD and No Cut-Through SVC results.

FIG. 5 details the contents of the PMD.

DETAILED DESCRIPTION OF THE INVENTION

The present invention is directed to a method and architecture for allocating network resources (e.g., bandwidth, priority) based on the type of application that is being used at the communicating endpoints. The Asynchronous Transfer Mode (ATM) Architecture and the RSVP protocol in combination have the necessary components to enable the allocation of network resources based on the application. In the ATM protocol traffic descriptors and the Quality of Service (QoS) feature can be used to establish different network requirements based on the application. For example, since a telnet session uses smaller infrequent packets which could be transferred through a router, a set of traffic descriptors and Quality of Service parameters that defines this kind of connection could be established. However, if a video conference is established, large, delay sensitive packets would be frequently generated. Therefore, a dedicated switched virtual circuit with low delay sensitive characteristics would be more efficient to carry on a video conferencing session.

The RSVP protocol is implemented with components that complete the requirements necessary to create bandwidth allocations based on QoS. The RSVP protocol includes classifiers, which classify the packets, and flow specifications which define and detail relevant characteristics of the packets. Lastly, the RSVP parameters and flow specifications are mapped to ATM switched virtual circuits with corresponding traffic descriptors and QoS parameters using a policy mapping database(PMD). The policy mapping database correlates the RSVP flow specifications to the ATM QoS parameters of switched virtual circuits.

Figure 1:
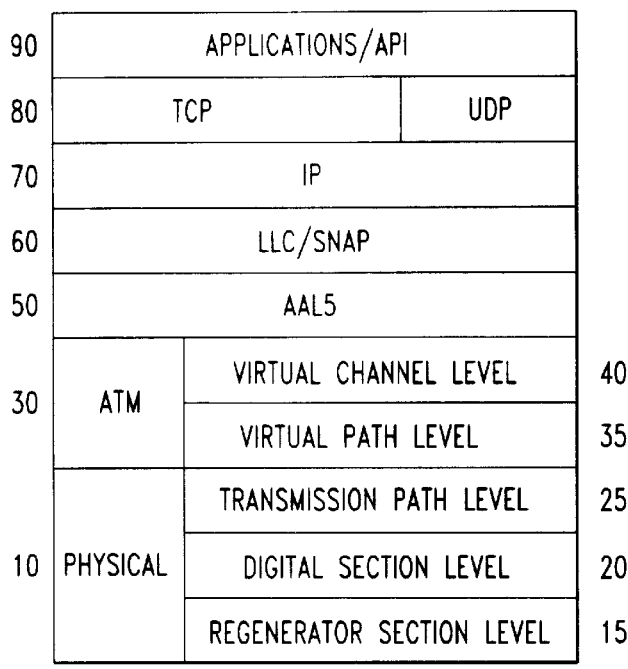
FIG. 1 displays the TCP/IP protocol stack over the Asynchronous Transfer Mode protocol stack.
Figure 2:
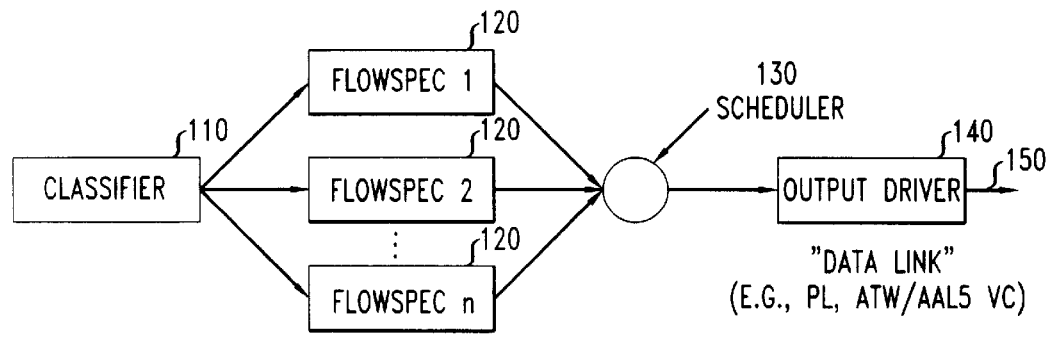
FIG. 2 displays RSVP operation over a non-QoS capable sub-network.
Figure 3:
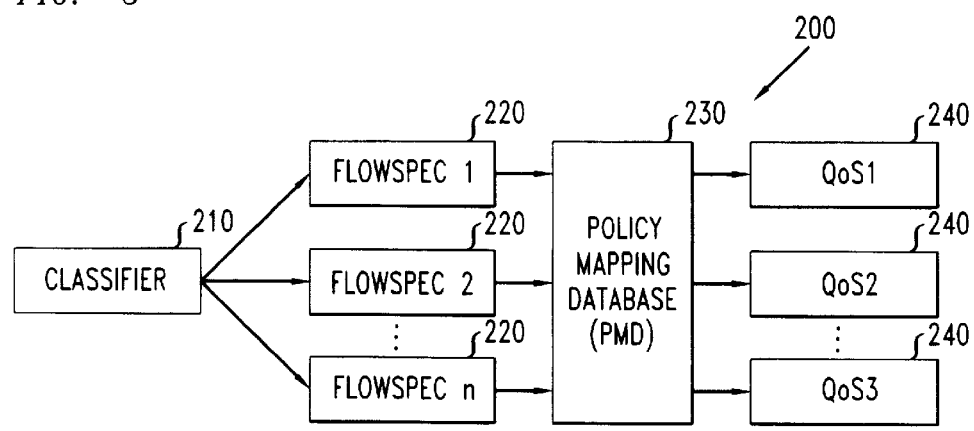
FIG. 3 displays a flow model of the RSVP protocol over IP over ATM with a Policy Mapping Database (PMD) used to manage the protocol translation.

FIG. 3 displays a flow model of the present invention. The flow model of RSVP over ATM correlates the flow specifications and QoS Switched virtual circuits, to establish ATM SVC's. In FIG. 3 a classifier 210 classifies packets based on their session and filterspec parameters. Each classification of packets has an associated flow specification 220. The flow specifications 220 are fed into a policy mapping database 230. The policy mapping database (PMD) 230 maps the packets based on the flow specification 220. The PMD defined by 230 enables the mapping between the RSVP flow specification parameters 220 and the ATM QoS parameters 240. The mapping of flow specifications 220 to ATM SVC's, 240 is based on the resources required by the application (e.g., best effort traffic may be mapped to a router, and video conferencing would be mapped to separate SVC with appropriate traffic descriptors and QoS parameters). A user interface to the policy mapping database (PMD) can be established to allow users to manage the mapping for their own traffic.

Figure 4A:
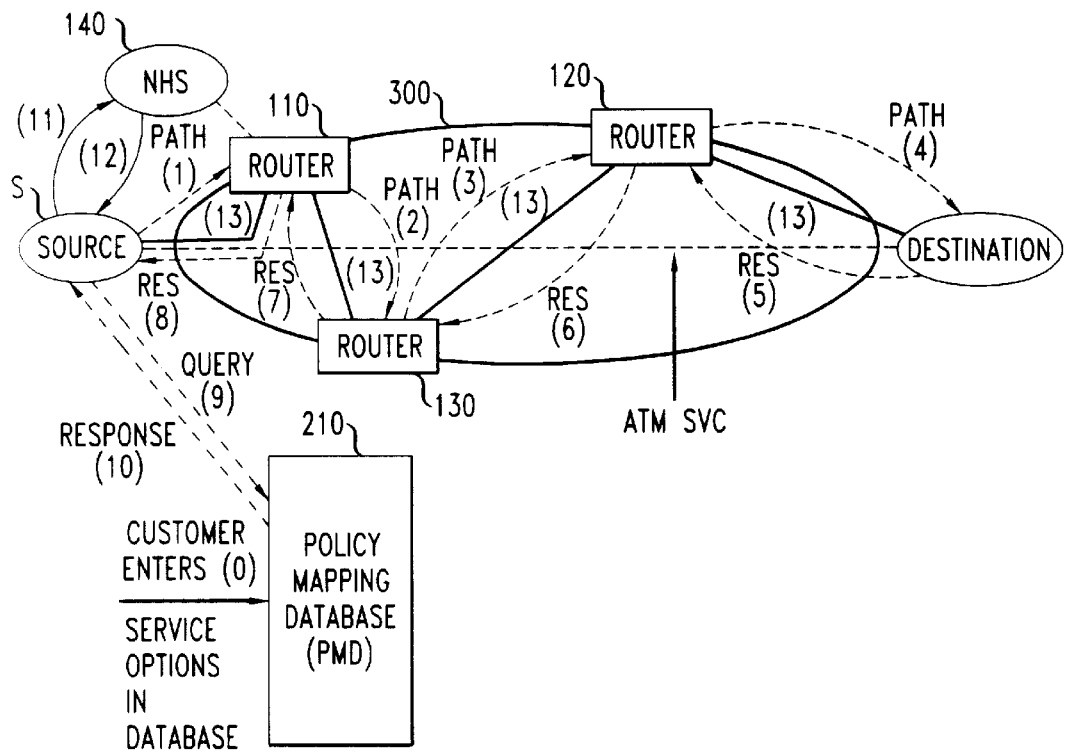
FIG. 4A describes a detailed communication between a source, a destination, the PMD, and an Address resolution/Next Hop server (NHS), utilizing the methodology of the present invention, where the source queries the NHS.

FIG. 4A gives an end-to-end flow diagram of the sequence of steps for the unicast (transmission of a packet from one end point to another endpoint) case. In the disclosed methodology the customers initially enters the various service options in the policy mapping database (0), together with the list of IP end-points to which the options apply (Note that a single customer may have multiple entries in the database, i.e., one subnet of the customer end-points may have different options than another subnet). When source (S) wishes to communicate with destination (D), the source (S) sends a path message (1) directed towards (D) via its next-hop router 110. The path message (1) is then forwarded hop-by-hop towards D via steps (2), (3), and (4). After D receives the path message it returns a reservation request back to S hop-by-hop in the reverse direction using the route taken by the path message in steps (5), (6), (7) and (8). The route information necessary for these steps is maintained in routers 110, 120, and 130 as PATH state information. When S, receives the reservation, it sends a query (9) to the PMD denoted by 210. The PMD does not have to be physically co-located with S. The PMD is reachable via its ATM address, which is known to S. The query (9) contains all the information from the original received reservation messages. Query (9) is processed by the PMD 210 and a response (10) containing the required ATM traffic descriptors and QoS parameters, and information pertaining to the various PMD specified options is returned to S. The details of the query and response messages from S to the PMD are specified below. Once S has the results of the response (10), and assuming the service options, network state, etc., permit cut-through, S sends an NHRP query (11) to its default NHS 140 and receives a response (12) containing D's ATM address. S then sets-up an ATM SVC (13) directly to D using the ATM QoS information from response (10).

Figure 4B:
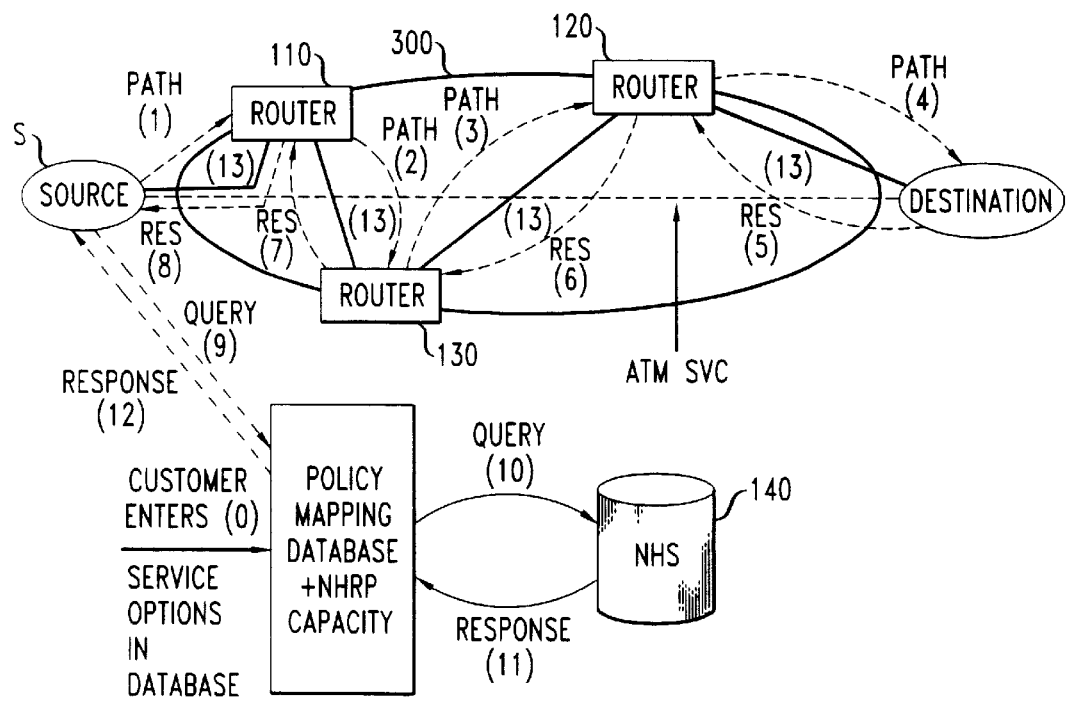
FIG. 4B describes a detailed communication between a source, a destination, the PMD, and an Address resolution/Next Hop server (NHS), utilizing the methodology of the present invention, where the PMD queries the NHS.

The methodology and architecture disclosed in FIG. 4A can be modified to improve performance and conduct processing on behalf of end-system clients. In the architecture of FIG. 4B, operation is identical to that of FIG. 4A up to and including query message (9). After receiving query (9), the PMD initiates an NHRP request (10) to the NHS on behalf of the source. The NHRP request (10) is signaled by an NHRP lookup option in the PMD query message (9), which also contains the IP address of D. When the PMD receives NHRP reply (11) for the NHS, it responds with (12) to the source. The response now additionally contains the ATM address corresponding to the IP address of D. The source S is now able to setup a call (13) directly to destination D, without having to go through the step of consulting an NHRP server, because the NHRP server was accessed by the PMD 210, or may be located in the PMD 210.

Figure 4C:
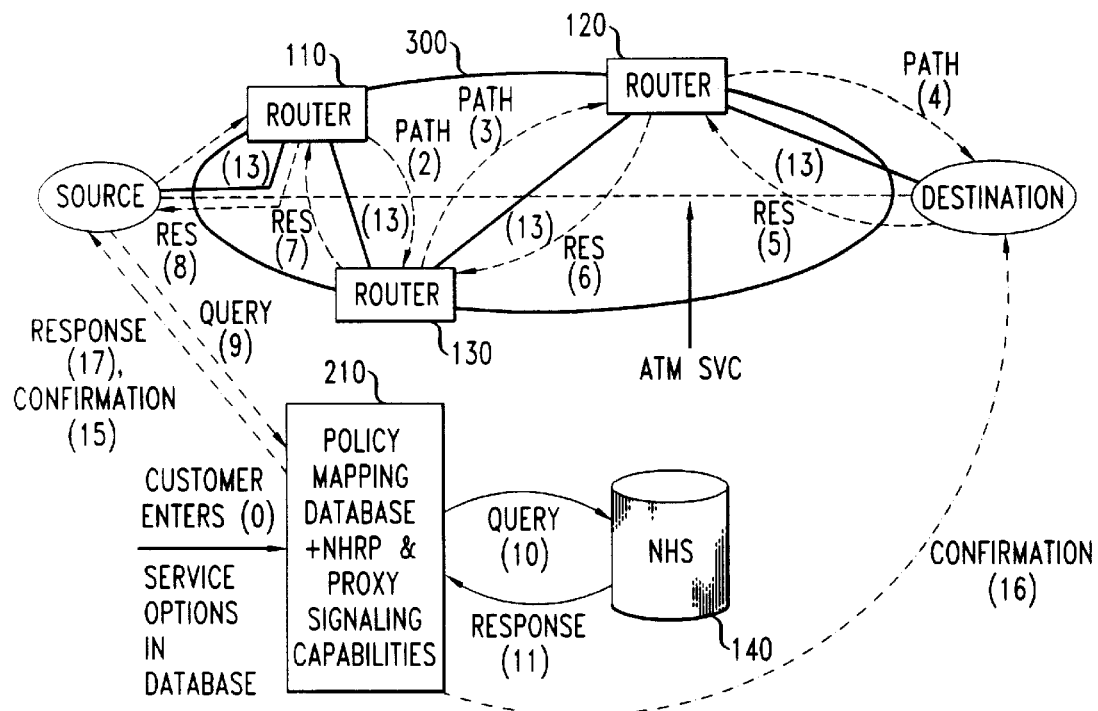
FIG. 4C describes a detailed communication between a source, a destination, the PMD, and an Address resolution/Next Hop server (NHS), utilizing the methodology of the present invention, where the PMD queries the NHS and sets up the connection between the source and destination using third party call setup mechanisms.

A further efficiency is possible when an NHRP lookup option is enabled. As shown in FIG. 4C, a 3rd party ATM call setup is initiated by the PMD 210 via proxy signaling (i.e., when a party other than the communicating endpoints signals the endpoints for communication established), denoted by (12). Proxy signaling is signaled by the source S to the PMD 210 by a 3rd party/proxy signaling call setup option in the PMD query message (9) (it is assumed that the PMD has been provisioned to carry-out proxy signaling on behalf of both S and D; this requires that a "signaling" Virtual Circuit be set-up between the PMD 210 and the communicating endpoints). In FIG. 4C, operation is identical to that of FIG. 4B, up to and including reply (11). Afterward the PMD 210 initiates a 3rd party ATM call setup request (12) via proxy signaling to the ATM network on behalf of both S and D. A connection (13) is then setup between S and D. When the connection setup is complete, a proxy signaling confirmation message (14) is received from the ATM Network 300. The PMD 210 then issues proxy signaling confirmation messages (15) to (D) and (16) to (S). The confirmation messages (15), (16) may include Virtual Path/Virtual Channel Identifier (VPI/VCI), addressing information, QoS, and other information received in message (14). The confirmation (15) to the source S may be piggy-backed in the PMD response (17), so that a separate message need not be sent. The source S is now able to send to destination D using the VPI/VCI information received in message (14) without either having to do an IP to ATM address translation, or an ATM call setup request.

A further modification to the methodology disclosed above results in a significant improvement to the overall performance of the system. The improvement results from not reserving resources in the intermediate routers (110, 120, 130) between the source S and the destination D in case a cut-through is permitted and an SVC is established between S and D. To explain this point, observe that in the above scenarios the RSVP Reservation Request message that was returned back from D to S results in the reserving of resources at each router (110, 120, 130) along the path from D to S. In case the end result is to permit cut-through and establish an ATM SVC between S and D, two issues result. First a mechanism should be used to free any reserved resources along the path defined through routers 120, 130, and 140. This can be simply achieved either through a time-out mechanism or by letting S send an RSVP Reservation Teardown message. The second more significant issue is that new reservations that actually require resources in these intermediate routers (e.g., because cut-through is not permitted for these reservations) may be blocked because of lack of resources in routers 110, 120, and 130, or associated links in the network, This issue is addressed by allowing D to query the PMD. If cut-through is permitted, then D establishes the SVC to S and sends its RSVP Reservation Request message to S over the SVC. In other words, no RSVP Reservation Request message is sent back hop-by-hop in the reverse direction along the route taken by the RSVP Path message, and no resources are reserved in the intermediate routers. Note that clearing the path state information in the intermediate routers (that was created when processing the Path message) is still required. This is not considered a problem because no considerable amount of memory is required to store the path state information.

There are still two issues to resolve at S, when using D to set-up the SVC. The first issue is how to associate the received RSVP Reservation Request message to the Path message that was previously sent. Observe that if D has queried the PMD and cut-through is permitted, the RSVP Reservation Request message is received by S over a virtual circuit which is different from the virtual circuit over which the RSVP Path message was sent. The RSVP protocol associates RSVP PATH and RSVP Reservation messages by using a message ID field in these messages. We additionally require the use of unique message ID over a single interface. The same message ID should not be used over separate virtual circuits supported on the interface to identify different reservations.

The second issue arises when S receives an RSVP Reservation Request message over the same virtual circuit that was used to send the RSVP Path message. The problem S faces is how to distinguish between the following two cases. The first case is that a query to the PMD was performed by D and cut-through was not permitted. In this case, a second query to the PMD by S must be avoided. The second case is that a query to the PMD was not performed by D and a query to the PMD by S must be performed. We solve this problem by defining an end-to-end user signaling mechanism between S and D. The method disclosed in the present invention advocates the use of an RSVP Object with an unassigned Class-Num (e.g., 64<Class-Num<128 are unassigned) to signal whether or not a query to the PMD was performed. Consistent with the RSVP specification, systems that do not recognize the Object will quietly ignore it. However systems that implement the methodology that is disclosed in the instant invention will recognize the Object and act on its information. In other words, the disclosed methodology advantageously utilizes unused bits in the RSVP protocol packet structure as a signaling mechanism to communicate information between sources and destinations.

Figure 4D:
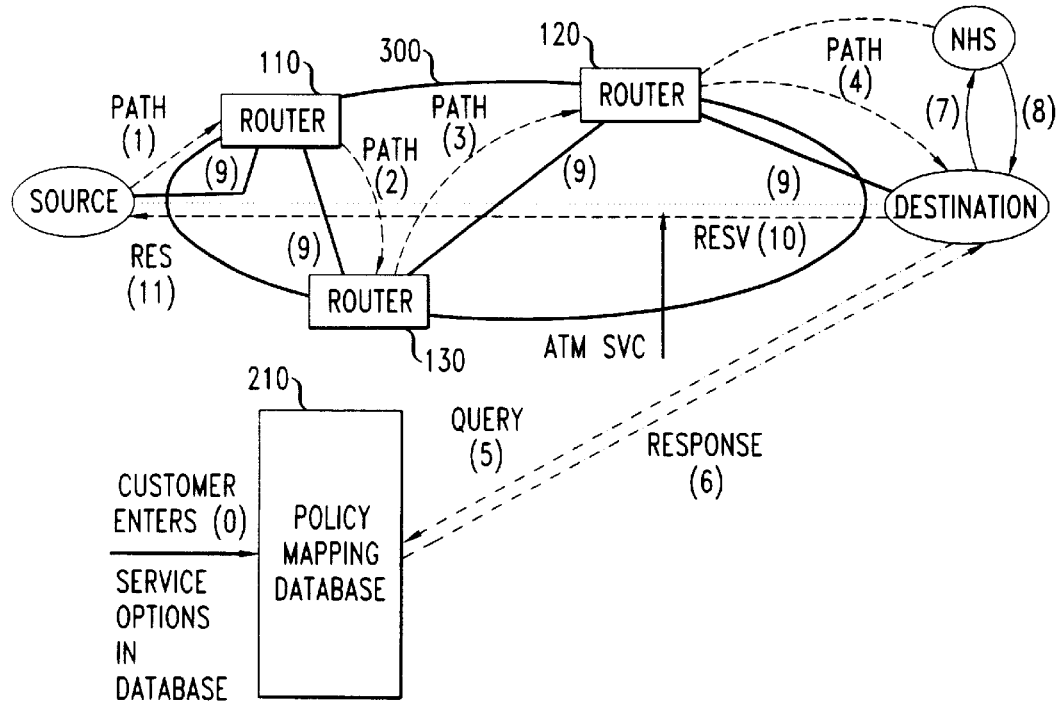
FIG. 4D shows a scenario where the destination station queries the PMD and sets up an SVC.

An example of the methodology defined above is presented in FIG. 4d and FIG. 4E. In FIG. 4D, operation is identical to that of FIG. 4A up to and including Path message (4). D sends a query (5) to the PMD 210. The query (5) contains the information from the Path message and D's requested reservation. Query (5) is processed by the PMD 210 and a response (6) containing the required ATM traffic descriptors, QoS parameters and the various options is returned to D. Once D has the results of the response (6) and cut-through is permitted (scenario when cut-through is not permitted is discussed below), it sends an NHRP query (7) to its default NHS and receives a response (8) containing the ATM address of S. D then sets up an ATM SVC (9) directly to S using the ATM QoS information from response (6). D then sends the RSVP Reservation Request message (10) to S over the established ATM SVC. S associates the RSVP Reservation Request message (10) to the RSVP Path message (1) by the use of the message ID fields in messages (1) and (10).

In FIG. 4E, operation is identical to that of FIG. 4D up to and including the query response (6) returned by the PMD 210 to D. Once D has the results of the response (6) and cut-through is not permitted, D sends an RSVP Reservation Request message via Res (7), Res (8), Res (9) and Res (10) to S, using the stored path state information in routers 120, 130, and 110 along the path from D to S. When S receives the reservation (10), it determines that a query to the PMD 210 was performed (communicated via the Object with 64<Class-Num<128 mechanism described above) and that no query to the PMD 210 by S is needed. However if S determines that a query to the PMD 210 was not performed at D, it sends a query to the PMD 210. This is the case illustrated in FIG. 4A.

Note that the methodology described in FIGS. 4A to 4E applies to the IP unicast case (i.e., a single transmitter sending IP packets to a single receiver). The methodology described in FIGS., 4D and 4E (where the destination rather than the source queries the PMD) 210 is also appropriate for the IP multicast case (i.e., a single transmitter sends IP packets to a group of receivers). In the multicast case, receivers decide whether or not to join a particular multicast group. The transmitter may not even be aware of which receivers are receiving its transmission. The receiver-driven nature of IP multicast is therefore well accommodated by having receivers/destinations query the PMD 210, as shown in FIGS. 4d and 4e. When cut-through is permitted, it is accomplished by a ATM level leaf-initiated join operation to either the source or an intermediate multicast server. Note further that just as in the unicast case, in the multicast case the PMD 210 may both resolve IP addresses to ATM addresses and perform third party multipoint call setup functions on behalf on the querying entity. Furthermore if PMD 210 performs such functions it may also implement address screening thereby providing an optional security function to multicast (and unicast) communication.

FIG. 5 details the contents of the Policy Mapping Database (PMD). For each set of IP end-points, a customer enters whether or not to:

(i) Enable cut-through with QoS mapping: When enabled, ATM cut through to the destination is always attempted. There is a mapping of RSVP flow specification parameters to ATM QoS parameters and traffic descriptors. Depending on the reservation style of RSVP, the mapping of RSVP flows to ATM. VCs may be 1 to 1 or many to 1.

(ii) Enable cut-through without QoS mapping: When enabled, ATM cut-through to the destination is always attempted. The ATM SVC is always "best-effort" with no QoS parameters or traffic descriptors being set. The mapping is typically many to 1.

(iii) Disable cut-through, support hop-by-hop QoS mapping: When enabled, ATM cut-through is not attempted. Packets are forwarded hop-by-hop according to the Classical IP router-based packet forwarding model. The mapping of RSVP flow specification parameters to ATM QoS parameters and traffic descriptors takes place on a hop-by-hop basis. Depending on the reservation style of RSVP, the mapping of RSVP flows to ATM VCs may be 1 to 1 or many to 1.

(iv) NHRP Lookup Option

If No, then ignored.

If Yes, then the PMD invokes the NHRP server (NHS) on behalf of the source and returns the result of the query (i.e., the ATM address of the destination) back to the source in the PMD response message.

Third party setup by proxy signaling option

If No, then ignored.

If Yes, then the PMD, having invoked the NHRP server (NHS) on behalf of the source, also sets up an ATM connection between the Source and Destination using proxy signaling. If enabled, this sub-option assumes that both the Source and Destination have been provisioned to allow the PMD to act as a proxy signaling agent for each.

(v) Restrict cut-through option:

If No, then ignored.

If Yes, then the customer lists the set of destination domain names, and IP addresses for which cut-through is allowed for the given set of IP end-points. Address prefixes and domain names suffices are permitted. Cut-through is not attempted to destinations not in this list.

(vi) Day/Time-of-day override:

If No, then ignored.

If Yes, then customer enters the days of the month and times of the day, for which cut-through is not to be attempted.

(vii) Multicast cut-through allowed:

If No, then cut-through is not attempted for multicast destinations (i.e. if the destination address is a class D address).

If Yes, then cut-through is permitted. The customer may also list the set of class D addresses for which cut-through is allowed, and the list of ATM end-points that may join a particular multicast group.

(viii) Backup Option:

If Yes, then (a) if current set of options require cut-through, and if cut-through fails, attempt a hop-by-hop setup.

(b) if current set of options require hop-by-hop and RSVP setup fails, attempt a cut-through.

(ix) Use alternate ATM path when primary ATM path fails:

If No, then ignored.

If Yes, then assuming that the destination is reachable from the source by 2 or more distinct ATM networks, and that PNNI routing between these networks is not employed, the source may have 2 or more distinct ATM addresses for a given IP destination. When a call setup attempt to the first ATM address fails, a second, third, etc., attempt is made to the second, third, etc., ATM address, until an attempt succeeds, or there are no more alternate addresses.

The above options may be grouped together to provide different levels/categories of service to customers. For example, one (high) level of service might consist of enabling options (i), (vii), and (viii), while another level of service might consist of enabling options (ii), (iv), and (v). Further the details of each option may change, and additional options may be added to the database without changing the overall operation of the invention.

An exemplary database query and response message contains the following parameters:

Query

1. The RSVP flow specification including both the traffic specifications (amount and characteristics of bandwidth needed), service specific parameters (e.g., packet delay, packet jitter, packet loss), and the filter specification identifying and characterizing the stream of packets in the packet flow.

Response

1. The contents of the query as described above.

2. ATM related parameters

Cut-through or not

ATM traffic descriptors

ATM QoS parameters

Backup enabled (Yes/No)

Alternate ATM (Yes/No)

If NHRP lookup is enabled, the ATM address corresponding to the target IP address of the Query message.

If 3rd party setup is enabled, then the ATM Virtual Path/Virtual channel identifiers to use (VPI/VCI) to reach the IP target.

Note that the query and response message content can be extended to allow override of some of the provisioned entries in the PMD on a call-by-call basis. For example one could request NHRP lookup for some connections but not for others. The query messages are simply augmented by the addition of the various options. It should also be appreciated that the system can also operate successfully even if the contents of the query message contains a subset (e.g. port number and destination address) of information. For example, if information pertaining only to the filter-specification was available it is still possible to accomplish a mapping from destination address and port number to ATM QoS. This enables the system to be used even when RSVP is not employed.

While several embodiments of the invention are disclosed and described, it should be appreciated that various modifications may be made without departing from the spirit of the invention or the scope of the subjoined claims.

We claim:

1. A method of operating a network capable of utilizing Internet protocol, resource reservation protocol, and asynchronous transfer mode protocol, based on auxiliary user information, said method comprising:

providing a policy mapping database with said auxiliary user information; and mapping parameters in said resource reservation protocol to parameters in said asynchronous transfer mode protocol utilizing said auxiliary information in said policy mapping database;

wherein said auxiliary user information is a set of policies, definable by an end user, regarding a pathway of communication of packets sent or received by said end user over said network.

2. The method as claimed in claim 1, wherein said mapping comprises:

classifying packets in said network thereby creating classified packets;

separating said classified packets based on said parameters in said resource reservation protocol; and correlating said parameters in said resource reservation protocol with said parameters in said asynchronous transfer mode protocol utilizing said auxiliary information in said policy mapping database.

3. The method as claimed in claim 1, wherein:
said parameters in said resource reservation protocol are flow specifications.

4. The method as claimed in claim 1, wherein:
said parameters in said asynchronous transfer mode protocol are at least one of quality of service parameters and traffic descriptors.

5. A method of operating a network based on information regarding user applications, said method comprising:
defining a communications path, for use by a user application, with a path message;
utilizing a reservation message to reserve resources along said communications path, said reservation message containing flow specifications;
mapping said flow specifications to related parameters in an asynchronous transfer mode protocol utilizing a policy mapping database containing auxiliary information regarding said user application, said policy mapping database being accessible from said network; and
establishing a switched virtual circuit based on said mapping;
wherein said auxiliary user information is a set of policies, definable by an end user, regarding a pathway of communication of packets sent or received by said end user over said network.

6. The method as claimed in claim 5, wherein:
said auxiliary information is information customized on a user by user level.

7. The method as claimed in claim 5, wherein:
said policy mapping database is centralized for access from a network level.

8. The method as claimed in claim 5, wherein:
said flow specifications include at least one of traffic specification service specific parameters, and a filter specification which identifies and characterizes a stream of packets.

9. The method as claimed in claim 5, wherein:
said related parameters in said asynchronous transfer mode protocol include at least one of asynchronous transfer mode protocol traffic descriptors and asynchronous transfer mode protocol quality of service parameters.

10. The method as claimed in claim 5, wherein said auxiliary information regarding said user application includes at least one of:
cut-through enable with quality of service mapping;
cut-throuqh enable without quality of service mapping;
cut-throuqh disable;
next hop resolution protocol lookup;
third party setup;
restricted cut through;
multicast cut-through enabled;
allowable multicast group and group membership;
backup enabled; and
alternate asynchronous transfer mode protocol path enabled.

11. A method of operating a network based on information regarding user applications, resources in said network including a source, a destination, a next hop resolution protocol server, and a policy mapping database including auxiliary user information regarding a plurality of users, said method comprising:

sending a path message from said source to said destination;
returning a reservation message, based on said path message, from said destination to said source;
sending a query message from said source to said policy mapping database, said query message containing resource reservation protocol information acquired from at least one of said path message and said reservation message;
returning a response message, based on said query message, from said policy mapping database to said source, said response message containing asynchronous transfer mode protocol parameters determined utilizing said auxiliary user information in said policy mapping database;
utilizing said response message to generate a query request from said source to said next hop resolution protocol server to determine an asynchronous transfer mode protocol address for said destination,
transmitting an asynchronous transfer mode protocol address from said next hop resolution protocol server to said source; and
utilizing said asynchronous transfer mode protocol address to establish a switched virtual circuit from said source to said destination;
wherein said auxiliary user information is a set of policies, definable by an end user, regarding a pathway of communication of packets sent or received by said end user over said network.

12. A method of providing network resources based on information regarding user applications, said network resources including a source, a destination, a next hop resolution protocol server, and a policy mapping database including auxiliary user information regarding a plurality of users, said method comprising:
transmitting a path message from said source to said destination;
returning a reservation message from said destination to said source;
transmitting a query message from said source to said policy mapping database, said query message containing resource reservation protocol information acquired from at least one of said path message and said reservation message;
transmitting a query message from said policy mapping database to said next hop resolution protocol server;
returning an asynchronous transfer mode protocol address for said destination to said policy mapping database;
returning a response message from said policy mapping database to said source, said response message containing at least one of asynchronous transfer mode protocol parameters and said asynchronous transfer mode protocol address of said destination determined utilizing said auxiliary user information in said policy mapping database; and
establishing a switched virtual circuit between said source and said destination based on said response message;
wherein said auxiliary user information is a set of policies, definable by an end user, regarding a pathway of communication of packets sent or received by said end user.

13. A method of providing network resources based on information regarding user applications, said network resources including a source, a destination, a next hop resolution protocol server, and a policy mapping database containing auxiliary user information regarding a plurality of users, said method comprising:

transmitting a path message from said source to said destination;

returning a reservation message from said destination to said source;

transmitting a query message from said source to said policy mapping database, said query message containing resource reservation protocol information acquired from at least one of said path message and said reservation message;

transmitting a query message from said policy mapping database to a next hop resolution protocol server, said query message including information obtained from said auxiliary user information in said policy mapping database;

returning an asynchronous transfer mode protocol address for said destination to said policy mapping database; and utilizing said policy mapping database as a third party proxy to establish a switched virtual circuit connection between said source and said destination;

wherein said auxiliary user information is a set of policies, definable by an end user, regarding a pathway of communication of packets sent or received by said end user.

14. A method of providing network resources based on information regarding user applications, said network resources including a source, a destination, a resource reservation protocol server, and a policy mapping database containing auxiliary user information regarding a plurality of users, said method comprising:

transmitting a path message from said source to said destination;

transmitting a query message from said destination to said policy mapping database, said query message containing resource reservation protocol information acquired from at least one of said path message and from said destination;

returning a response message from said policy mapping database to said destination, said response message including at least one of asynchronous transfer mode protocol traffic descriptors and quality of service parameters determined at least in part based on auxiliary user information contained in said policy mapping database;

utilizing said destination to query said next hop resolution protocol server for an asynchronous transfer mode protocol address of said source;

establishing a switched virtual circuit between said destination and said source utilizing at least one of said asynchronous transfer mode protocol address of said source and said response message; and returning a reservation message from said destination to said source via said switched virtual circuit;

wherein said auxiliary user information is a set of policies, definable by an end user, regarding a pathway of communication of packets sent or received by said end user.

15. A method of providing network resources based on information regarding user applications, said network resources including a source, a destination, a next hop resolution protocol server, and a policy mapping database containing auxiliary user information, said method comprising:

transmitting a path message from said source to said destination;

transmitting a query message from said destination to said policy mapping database, said query message containing resource reservation protocol information acquired from at least one of said path message and said destination;

transmitting a query message from said policy mapping database to a next hop reservation protocol server on behalf of said destination with a sender IP address as a target;

returning an asynchronous transfer mode protocol address for said source to said policy mapping database;

returning a response message from said policy mapping database to said destination, said response message including at least one of resource reservation protocol parameters, asynchronous transfer mode protocol parameters and said asynchronous transfer mode protocol address of said source, determined at least in part based on said auxiliary user information contained in said policy mapping database;

establishing a switched virtual circuit between said destination and said source utilizing at least one of said asynchronous transfer mode protocol address of said source, said asynchronous transfer mode protocol parameters and said resource reservation protocol parameters; and returning a reservation message from said destination to said source via said switched virtual circuit;

wherein said auxiliary user information is a set of policies, definable by an end user, regarding a pathway of communication of packets sent or received by said end user.

16. A method of providing network resources based on information regarding user applications, said network resources including a source, a destination, a next hop resolution protocol server, and a policy mapping database containing auxiliary user information, said method comprising:

transmitting a path message from said source to said destination;

transmitting a network level query message from said destination to said policy mapping database, said query message containing resource reservation protocol information acquired from at least one of said path message and from said destination;

transmitting a query message from said policy mapping database to a next hop resolution protocol server on behalf of said destination with a sender IP address as a target;

returning an asynchronous transfer mode protocol address for said source to said policy mapping database;

utilizing said policy mapping database containing auxiliary user information as a third party proxy to set-up a switched virtual circuit connection between said source and said destination;

returning a response message from said policy mapping database to said destination, said response message including at least one of resource reservation protocol parameters, asynchronous transfer mode protocol parameters, said asynchronous transfer mode protocol address, and a virtual path identifier/virtual channel identifier of said source; and returning a reservation message from said destination to said source via said switched virtual circuit;

wherein said auxiliary user information is a set of policies, definable by an end user, regarding a pathway of communication of packets sent or received by said end user.

17. An Internet protocol over asynchronous transfer mode protocol network comprising:

a plurality of Internet protocol packet classifiers, each packet classifier having an assigned flow specification;

a plurality of quality of service based switched virtual circuits; and a policy mapping database relating said plurality of Internet protocol packet classifiers to respective ones of said plurality of quality of service based switched virtual circuits based on auxiliary user information contained in said policy mapping database;

wherein said auxiliary user information is a set of policies, definable by an end user, regarding a pathway of communication of packets sent or received by said end user.

18. The method of providing network resources based on information regarding user applications according to claim 14, further comprising:

utilizing unused bits in said reservation message to signal to said source that a cut-through has already been performed.

19. The method of providing network resources based on information regarding user applications according to claim 15, further comprising:

utilizing unused bits in said reservation message to signal said source that a cut-through has already been performed.

20. The method of providing network resources based on information regarding user applications according to claim 16, further comprising:

utilizing unused bits in said reservation message to signal said source that a cut-through has already been performed.

* * * * *